United States Patent
Hatta et al.

(10) Patent No.: US 6,781,852 B2
(45) Date of Patent: Aug. 24, 2004

(54) SWITCHING POWER SUPPLY USING A TRANSFORMER, RECTIFIER, CONTROL CIRCUIT AND VOLTAGE GENERATING CIRCUITS

(75) Inventors: Masaharu Hatta, Chuo-ku (JP); Haruhiko Hatakeyama, Chuo-ku (JP); Masato Watanabe, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/304,783

(22) Filed: Nov. 26, 2002

(65) Prior Publication Data

US 2003/0103360 A1 Jun. 5, 2003

(30) Foreign Application Priority Data

Dec. 5, 2001 (JP) ........................................ 2001-370818
Jan. 16, 2002 (JP) ........................................ 2002-006995

(51) Int. Cl.[7] ............................................. H02M 3/335
(52) U.S. Cl. ...................................................... 363/17
(58) Field of Search ........................... 363/86, 97, 123, 363/15, 16, 65, 17

(56) References Cited

U.S. PATENT DOCUMENTS

| | | | | |
|---|---|---|---|---|
| 4,533,986 A | * | 8/1985 | Jones | 363/17 |
| 4,686,615 A | * | 8/1987 | Ferguson | 363/17 |
| 5,870,299 A | | 2/1999 | Rozman | 363/127 |
| 5,956,245 A | | 9/1999 | Rozman | 363/89 |
| 6,504,735 B2 | * | 1/2003 | Negru et al. | 363/25 |
| 6,567,284 B2 | * | 5/2003 | Huang | 363/98 |
| 6,650,552 B2 | * | 11/2003 | Takagi et al. | 363/17 |

FOREIGN PATENT DOCUMENTS

| | | |
|---|---|---|
| JP | 11-341799 | 12/1999 |
| JP | 2000-358365 | 12/2000 |

* cited by examiner

*Primary Examiner*—Shawn Riley
(74) *Attorney, Agent, or Firm*—Seed IP Law Group PLLC

(57) ABSTRACT

A switching power supply which can prevent the output voltage Vout from fluctuating or undershooting when the instruction for stopping the operation is issued is disclosed. A switching power supply according to the present invention employs a transformer having a primary coil and a secondary coil, a switching circuit connected between an input terminal and the primary coil of the transformer, a rectifier connected to the secondary coil of the transformer, a smoothing circuit located at a subsequent stage of the rectifier and including an output capacitor, a control circuit controlling the switching circuit, and an operating voltage generating circuit, responsive to an instruction for stopping a switching operation, for supplying an operating voltage to the control circuit using at least energy stored in the output capacitor. Thus, the switching power supply of the present invention can substantially linearly lower the output voltage Vout.

19 Claims, 9 Drawing Sheets

SWITCHING POWER SUPPLY USING A TRANSFORMER, RECTIFIER, CONTROL CIRCUIT AND VOLTAGE GENERATING CIRCUITS

BACKGROUND OF THE INVENTION

The present invention relates to a switching power supply, and more specifically, to a switching power supply that can prevent an output voltage Vout from undershooting and fluctuating when the operation of the switching power supply is stopped.

DESCRIPTION OF THE PRIOR ART

Switching power supplies are widely used as power supplies for electrical and electronic equipment such as computers.

FIG. 7 is a circuit diagram showing a conventional switching power supply.

As shown in FIG. 7, the conventional switching power supply is composed of a transformer T1, a switching circuit located on the primary side of the transformer T1, and a rectifier of the self-drive type and a smoothing circuit located on the secondary side of the transformer T1. The switching power supply lowers a DC (direct current) input voltage Vin supplied to the switching circuit located on the primary side to generate a DC output voltage Vout and supplies it to a load. In FIG. 7, the load is represented by a resistance component RLoad, capacitance component CLoad, and reactance component LLoad.

A control circuit 10 controls main switches Q1 and Q2 included in the switching circuit of the primary side based on the output voltage Vout. Specifically, the control circuit 10 lowers the duty factor of the main switches Q1 and Q2 when the output voltage Vout increases relative to the desired voltage so as to decrease the electric power supplied to the load and raises the duty factor of the main switches Q1 and Q2 when the output voltage Vout decreases relative to the desired voltage so as to increase the electric power supplied to the load. Thus, the output voltage Vout supplied to the load can be always stabilized at the desired voltage. Because the control circuit 10 belongs to the primary side, the control circuit 10 cannot receive the output voltage Vout directly. The control circuit 10 is therefore supplied via an isolation circuit 20 with a voltage Vout' associated with the output voltage Vout.

Operating voltage Vcc for the control circuit 10 is generated by an operating voltage generation circuit consisting of a transistor Tr1, resistor R1, and zener diode Z1. A capacitor C3 is connected between power terminals of the control circuit 10 for stabilizing the operating voltage Vcc. The operating voltage generation circuit is activated when an operation switch S1 is in the ON state and inactivated when the operation switch S1 is in the OFF state. The operation switch S1 can be controlled from the outside. When the operation of the switching power supply shown in FIG. 7 is to be started, the operation switch S1 is turned ON; when the operation of the switching power supply is to be terminated, the operation switch S1 is turned OFF.

Rectifying switches Q3 and Q4 included in the rectifier of the secondary side are self-driven by the secondary voltage of the transformer T1. Further, resistors R2 and R3 are inserted between the gate electrodes and the source electrodes of the rectifying switches Q3 and Q4, respectively, so as to prevent the gate electrodes of the rectifying switches Q3 and Q4 from being in a floating state.

Next, the operation of the conventional switching power supply shown in FIG. 7 will be explained.

FIG. 8 is a timing chart showing the operation of the conventional switching power supply shown in FIG. 7.

As shown in FIG. 8, when the operation switch S1 is in the ON state, the gate-source voltages $V_{GS}(Q1)$ and $V_{GS}(Q2)$ of the main switches Q1 and Q2 are alternately activated to a high level at a predetermined switching frequency under the control of the control circuit 10. As a result, the polarity of the primary voltage $V_{LP}$ of the transformer T1 is alternately inversed, so that primary side capacitors C1 and C2 are alternately charged and discharged.

Synchronously with the operation of the primary side, the polarity of the secondary voltage appearing at secondary coils Ls1 and Ls2 of the transformer T1 is alternately inversed, so that the rectifying switches Q3 and Q4 are alternately brought into ON state in turn at the predetermined switching frequency. More specifically, while the main switch Q1 is in the ON state owing to the gate-source voltage $V_{GS}(Q1)$ being at a high level, the gate-source voltage $V_{GS}(Q3)$ of the rectifying switch Q3 is raised to a voltage greater than the threshold voltage thereof by the voltage (secondary voltage) appearing at secondary coil Ls2, whereby the rectifying switch Q3 turns ON. On the contrary, while the main switch Q2 is in the ON state owing to the gate-source voltage $V_{GS}(Q2)$ being at a high level, the gate-source voltage $V_{GS}(Q4)$ of the rectifying switch Q4 is raised to a voltage greater than the threshold voltage thereof by the voltage (secondary voltage) appearing at secondary coil Ls1, whereby the rectifying switch Q4 turns ON.

As a result, the secondary voltage of alternately inversed polarity is rectified. The rectified voltage is smoothed by the smoothing circuit, which consists of an output reactor Lout and output capacitor Cout so that the stabilized output voltage Vout is generated.

On the other hand, when the operation switch S1 is turned OFF at a certain time, the operation of the control circuit 10 is stopped because the transistor Tr1 turns OFF, so that both the main switches Q1 and Q2 are put in the OFF state. That is, the switching operation is stopped.

However, because the operation of the switching circuit of the primary side is stopped when the operation switch S1 is turned OFF, one or the other of the rectifying switches Q3 and Q4 is kept in the ON state and a reverse current begins to flow from the output capacitor Cout and the capacitance component CLoad of the load to the output reactor Lout.

FIG. 8 shows the case where the rectifying switch Q3 is kept in the ON state at first in response to the operation switch S1 being turned OFF. In this case, because the switching circuit of the primary side is stopped, the discharge path for the electric charge of the gate electrode of the rectifying switch Q3 is substantially only the resistor R2. Therefore, the gate-source voltage $V_{GS}(Q3)$ of the rectifying switch Q3 falls gradually owing to the current flow through the resistor R2. During this period, the reverse current flowing to the output reactor Lout continues.

On the other hand, when the rectifying switch Q3 turns OFF because the gate-source voltage $V_{GS}(Q3)$ of the rectifying switch Q3 falls below the threshold voltage thereof owing to the decrease of the output voltage Vout and the secondary voltage by discharge of the output capacitor Cout and the capacitance component CLoad of the load and discharge of the electric charge from the gate electrode of the rectifying switch Q3 via resistor R2, a flyback voltage rises at the transformer T1. The flyback voltage boosts an internal voltage Vp in the switching circuit via the transformer T1 and boosts the gate-source voltage $V_{GS}(Q4)$ of the rectifying switch Q4. Therefore, the rectifying switch Q4 stays ON.

As shown in FIG. 8, because the direction of the current flowing to the output reactor Lout via the rectifying switch Q4 becomes forward temporarily, the output capacitor Cout and the capacitance component CLoad of the load are charged during this period, so that the output voltage Vout is increased.

Then, when the direction of the current flowing to the output reactor Lout becomes reverse, the gate-source voltage $V_{GS}(Q4)$ of the rectifying switch Q4 falls gradually owing to the decrease of the output voltage Vout and the secondary voltage by discharge of the output capacitor Cout and the capacitance component CLoad of the load and discharge of the electric charge from the gate electrode of rectifying switch Q4 via resistor R3. Then, when the rectifying switch Q4 turns OFF because the gate-source voltage $V_{GS}(Q4)$ of the rectifying switch Q4 falls below the threshold voltage thereof, the flyback voltage rises again at the transformer T1, which boosts the internal voltage Vp in the switching circuit via the transformer T1 and boosts the gate-source voltage $V_{GS}(Q3)$ of the rectifying switch Q3. Therefore, the rectifying switch Q3 stays ON.

Such operations are periodically repeated until the output capacitor Cout and the capacitance component CLoad of the load are consumed by the secondary side circuit and the resistance component RLoad of the load. Therefore, the output voltage Vout gradually decreases while fluctuating over very long period compared with the switching period and, in addition, the internal voltage Vp in the switching circuit is gradually increased.

As described above, in the conventional switching power supply, because the output voltage Vout does not decrease linearly but falls gradually while fluctuating over very long period compared with the switching period even if an instruction to stop the operation of the switching power supply is issued (the switch S1 is turned OFF), some malfunction may arise in the load. For example, the load may be designed to discriminate when the operation of the switching power supply has stopped and perform a certain operation when the output voltage Vout falls below a predetermined voltage. But if the output voltage Vout gradually decreases while fluctuating, discriminating whether the switching power supply as stopped becomes difficult.

Further, in the conventional switching power supply, because the internal voltage Vp in the switching circuit gradually increases during termination of operation, electric components used on the primary side may be damaged. In order to prevent this, components having a high withstand voltage must be used. This increases the cost of the switching power supply.

Furthermore, in the conventional switching power supply, because large current flows through the output reactor Lout, the secondary coils Ls1 and Ls2 of the transformer T1 and the rectifying switches Q3 and Q4 during termination of operation, the reliability of the switching power supply may be degraded because the output reactor Lout, the secondary coils Ls1 and Ls2 of the transformer T1 and the rectifying switches Q3 and Q4 release a large amount of heat.

These problems become more pronounced as the resistance component RLoad of the load becomes larger. Therefore, in the case where the instruction to terminate operation is issued in a light-load condition, the problems are serious. Further, the problems become more pronounced as the capacitance component CLoad of the load becomes large, the problems are also serious when the electric power is supplied to a load having a large capacitance component CLoad.

On the other hand, although the problems are not so serious when the resistance component RLoad of the load is considerably small (i.e., the load is heavy), in this case, some malfunction may arise in the load during the termination of operation owing to undershoot of the output voltage Vout. For example, when the output voltage Vout becomes negative, parasitic diodes and so forth in an integrated circuit (IC) employed in the load may turn ON. As this causes huge current to flow through the IC, the IC may malfunction or be damaged.

FIG. 9 is a timing chart showing the undershoot of the output voltage Vout during the termination of operation.

As shown in FIG. 9, when the operation of the switching circuit of the primary side is stopped by turning OFF the operation switch S1, the current $I_{RLoad}$ flowing through the resistance component RLoad is changed from the output current $I_{Lout}$ of the output reactor Lout to the discharge current $I_{Cout}$ of the output capacitor Cout and the voltage $V_{LLoad}$ rises at the reactance component LLoad of the load, so that current continues to flow. As a result, the output voltage Vout becomes negative, i.e., undershoot arises. Then, if the undershoot voltage reaches the forward voltage Vf of the body diodes of the rectifying switches Q3 and Q4, these body diodes turn ON. As a result, current begins to flow through the LCR serial circuit consisting of the rectifying switch Q3 (body diode), the secondary coil Ls1 of the transformer T1, the output reactor Lout, and the output capacitor Cout and another LCR serial circuit consisting of the rectifying switch Q4 (body diode), the secondary coil Ls2 of the transformer T1, the output reactor Lout, and the output capacitor Cout. Therefore, the peak value of the undershoot voltage is clamped to about $-Vf$.

Here, when the relationship between the resistance component RLoad, the reactance component LLoad, and the output capacitor Cout satisfies the formula (1), these LCR serial circuits oscillate. Undershoot arises as a result.

$$RLoad^2 < 4 \cdot \frac{LLoad}{Cout} \qquad (1)$$

As can be seen from the formula (1), undershoot tends to arise when the resistance component Rload is small (when the load is heavy). In order to prevent the switching power supply from undershooting, an additional capacitor Cex of sufficient capacitance needs to be connected in parallel with the output capacitor Cout because the resistance component RLoad and the reactance component LLoad belong to the load. This leads to an undesirable increase in number of components. The capacitance required by the additional capacitor Cex for preventing undershoot can be represented by formula (2):

$$C_{EX} > 4 \cdot \frac{LLoad}{RLoad^2} - Cout \qquad (2)$$

Because this problem is pronounced when the resistance component Rload is small, it becomes serious when the switching power supply is used to drive a load requiring a low voltage and a large current, such as a server computer.

As explained above, the conventional switching power supply has two main problems: one is that the output voltage Vout falls gradually while fluctuating over a very long period when an instruction for stopping the operation of the switching power supply is issued; and the other is that undershoot arises in the output voltage Vout when the instruction for stopping the operation of the switching power supply is issued. The former problem becomes pronounced when the resistance component Rload is large, while the latter problem becomes pronounced when the resistance component Rload is small. The latter problem arises whether or not the rectifier is a self-drive type.

SUMMARY OF THE INVENTION

It is therefore an object of the present invention to provide a switching power supply that prevents the output voltage Vout from undershooting when an instruction for stopping the operation of the switching power supply is issued.

Another object of the present invention is to provide a switching power supply that prevents the output voltage Vout from fluctuating when an instruction for stopping the operation of the switching power supply is issued.

A further object of the present invention is to provide a switching power supply that prevents the internal voltage Vp of the switching circuit from gradually increasing when an instruction for stopping the operation of the switching power supply is issued.

A still further object of the present invention is to provide a switching power supply that prevents a large amount of current from flowing through the output reactor Lout, the secondary coils Ls1 and Ls2 of the transformer T1 and the rectifying switches Q3 and Q4 when an instruction for stopping the operation of the switching power supply is issued.

Also according to these aspects of the present invention, the switching power supply can lower its output voltage substantially linearly without fluctuating or undershooting. Malfunction of the load can therefore be effectively avoided. Particularly, in the case where the rectifier is of a self-drive type, the internal voltage in the second converter is prevented from gradually increasing when an instruction for stopping the operation of the switching power supply is issued. The electric components used on the primary side are therefore effectively protected from damage. Further, because it is not necessary to use components having high withstand voltage, the cost of the switching power supply can be lowered. Furthermore, because a large current does not flow thorough the output reactor, the secondary coil of the transformer and the rectifier when the instruction is issued, the reliability of the switching power supply can be enhanced.

The above and other objects and features of the present invention will become apparent from the following description made with reference to the accompanying drawings.

DESCRIPTION OF THE PREFERRED EMBODIMENTS

Preferred embodiments of the present invention will be explained in detail with reference to the drawings.

Figure 1:
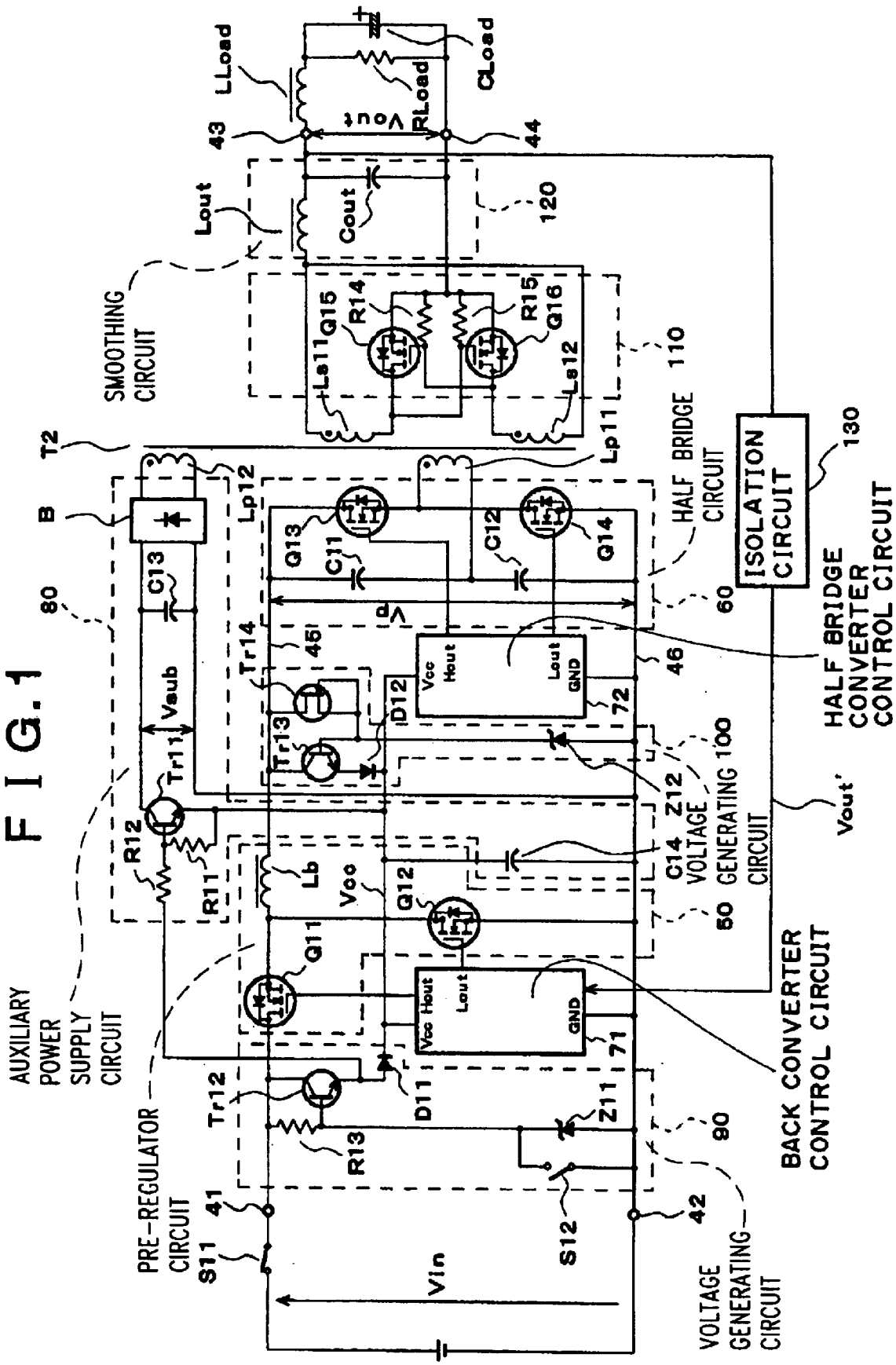
FIG. 1 is a circuit diagram showing a switching power supply that is a preferred embodiment of the present invention.

FIG. 1 is a circuit diagram showing a switching power supply that is a preferred embodiment of the present invention.

As shown in FIG. 1, the switching power supply of this embodiment can lower a DC (direct current) input voltage Vin supplied to a pair of input power terminals 41 and 42 to generate a DC output voltage Vout between a pair of output power terminals 43 and 44 and supply the DC output voltage Vout to a load. The switching power supply of this embodiment is composed of a pre-regulator circuit 50 connected to the input power terminals 41 and 42, a half bridge converter circuit 60 connected to the pre-regulator circuit 50 for exciting a primary coil Lp11 of a transformer T2, a pre-regulator control circuit 71 controlling the pre-regulator circuit 50, a half bridge converter control circuit 72 controlling the half bridge converter circuit 60, an auxiliary power supply circuit 80 for generating an operating voltage Vcc for the pre-regulator control circuit 71 and the half bridge converter control circuit 72 during normal operation, a first operating voltage generating circuit 90 for generating the operating voltage Vcc during the start of operation, a second operating voltage generating circuit 100 for generating the operating voltage Vcc during the termination of operation, a rectifier 110 of a self-drive type located on the secondary side of the transformer T2, and a smoothing circuit 120 connected between the rectifier 110 and the output power terminals 43 and 44.

Further, an operation switch S11 is provided between the input DC power source and the input power terminal 41. In order to activate the switching power supply, the operation switch S11 must be changed to the ON state from the outside. Although the operation switch S11 is not a component included in the switching power supply, it can be a component included in the switching power supply.

The pre-regulator circuit 50 includes main switches Q11 and Q12 and a smoothing reactor Lb. As shown in FIG. 1, the main switch Q11 and the smoothing reactor Lb are connected in series between the high-side input power terminal 41 and the half bridge circuit 60. The main switch Q12 is connected between the low-side input power terminal 42 and the node of the main switch Q11 and the smoothing reactor Lb. The pre-regulator circuit 50 can lower the input voltage Vin supplied between the input power terminals 41 and 42 to generate a DC internal voltage Vp between a pair of internal lines 45 and 46.

The half bridge converter circuit 60 includes main switches Q13 and Q14 connected between the pair of internal lines 45 and 46 in series and primary side capacitors C11 and C12 connected in series between the pair of internal lines 45 and 46. As shown in FIG. 1, the primary coil Lp11 of the transformer T2 is connected between a node of the main switches Q13 and Q14 and a node of the primary side capacitors C11 and C12.

The pre-regulator control circuit 71 is a circuit for controlling the switching operation of the main switches Q11 and Q12 included in the pre-regulator circuit 50 so that the main switches Q11 and Q12 are brought into the ON state in turn with intervention of a predetermined dead time under the control of the pre-regulator control circuit 71. The pre-regulator control circuit 71 controls the duty factor of the main switch Q1 based on the level of the output voltage Vout. Specifically, the pre-regulator control circuit 71 lowers the duty factor of the main switch Q11 when the output voltage Vout increases relative to the desired voltage so as to decrease the electric power supplied to the half bridge converter circuit 60 via the internal lines 45 and 46, and raises the duty factor of the main switch Q11 when the output voltage Vout decreases relative to the desired voltage so as to increase the electric power supplied to the half bridge converter circuit 60 via the internal lines 45 and 46. Thus, an internal voltage Vp having a stabilized level which depends on the DC input voltage Vin and the duty factor of the main switch Q11 is supplied to the half bridge converter circuit 60.

Because the pre-regulator control circuit 71 belongs to the primary side, the pre-regulator control circuit 71 cannot receive the output voltage Vout directly. The pre-regulator control circuit 71 is therefore supplied via an isolation circuit 130 with a voltage Vout' associated with the output voltage Vout. The minimum operating voltage of the pre-regulator control circuit 71 will be explained later.

The half bridge converter control circuit 72 is a circuit for controlling the switching operation of the main switches Q13 and Q14 included in the half bridge converter circuit 60 so that the main switches Q13 and Q14 are brought into the ON state in turn with a fixed duty factor. Thus, an output voltage Vout having a stabilized level appears between the pair of output power terminals 43 and 44 which depends on the internal voltage Vp and the turn ratio of the transformer T2. The minimum operating voltage of the half bridge converter control circuit 72 will be also explained later.

The auxiliary power supply circuit 80 is a circuit for generating the operating voltage for the pre-regulator control circuit 71 and the half bridge converter control circuit 72 during normal operation. The auxiliary power supply circuit 80 is composed of a diode bridge circuit B, smoothing capacitors C13 and C14, a transistor Tr11, and resistors R11 and R12. The diode bridge circuit B is a circuit for rectifying the voltage appearing at an auxiliary coil Lp12 provided on the primary side of the transformer T2. The voltage appearing between the output nodes of the diode bridge circuit B is smoothed by the smoothing capacitor C13 to produce an auxiliary power voltage Vsub. The transistor Tr11 is connected between the high-side output node of the diode bridge circuit B and a Vcc line. The resistor R11 is connected between the base and emitter electrodes of the transistor Tr11. The low-side output node of the diode bridge circuit B is directly connected to the internal line 46. The auxiliary power supply circuit 80 having the above-described structure supplies an operating voltage having a predetermined level to the Vcc line using the voltage appearing at the auxiliary coil Lp12 when the half bridge converter circuit 60 starts the switching operation. The operating voltage supplied to the Vcc line by the auxiliary power supply circuit 80 is referred to as "Vcc1."

The first operating voltage generating circuit 90 is a circuit for generating the operating voltage for the pre-regulator control circuit 71 and the half bridge converter control circuit 72 during the start of operation. The first operating voltage generating circuit 90 is composed of a transistor Tr12, a resistor R13, a zener diode Z11, a diode D11, and an operation switch S12. As shown in FIG. 1, the transistor Tr12 and the diode D11 are connected in series between the high-side input power terminal 41 and the Vcc line. The resistor R13 and the zener diode Z11 are connected in series between the high-side input power terminal 41 and the low-side input power terminal 42. A node of the resistor R13 and the zener diode Z11 is connected to the base electrode of the transistor Tr12 so that a zener voltage $V_{Z11}$ of the zener diode Z11 is applied to the base electrode of the transistor Tr12. Therefore, the voltage applied to the Vcc line when the transistor Tr12 is brought into the ON state can be represented as:

$$V_{Z11} - 2Vth$$

(where Vth represents both the voltage between the base and emitter electrodes of the transistor Tr12 and the forward voltage of the diode D11). The operating voltage supplied to the Vcc line by the first operating voltage generating circuit 90 is referred to as "Vcc2."

In this embodiment, a zener diode Z11 is selected whose zener voltage $V_{Z11}$ is represented as:

$$Vcc1 > Vcc2$$

Therefore, the first operating voltage generating circuit 90 is activated only at the start of the switching power supply operation. After the half bridge converter circuit 60 starts the switching operation, the transistor Tr12 is brought into the OFF state so that the first operating voltage generating circuit 90 is not involved in the operation of the switching power supply.

The operation switch S12 included in the first operating voltage generating circuit 90 is connected between opposite ends of the zener diode Z11. In order to activate the switching power supply, the operation switch S12 must be turned OFF from the outside. That is, in order to activate the switching power supply, the operation switch S11 must be turned ON and the operation switch S12 must be turned OFF. The operation of the switching power supply can be terminated either by turning the operation switch S11 OFF state or by turning the operation switch S12 ON.

The second operating voltage generating circuit 100 is a circuit for generating the operating voltage for the pre-regulator control circuit 71 and the half bridge converter control circuit 72 during the termination of operation. The second operating voltage generating circuit 100 is composed of transistors Tr13 and Tr14, a zener diode Z12, and a diode D12. The transistor Tr13 and the diode D12 are connected in series between the internal line 45 and the Vcc line. The transistor Tr14 is connected between the internal line 45 and the base electrode of the transistor Tr13. The zener diode Z12 is connected between the base electrode of the transistor Tr13 and the internal line 46. The gate and source electrodes of the transistor Tr14 are short-circuited so that the transistor Tr14 acts as a constant current element. A resistor may be used Instead of the transistor Tr14.

The zener voltage $V_{Z12}$ of the zener diode Z12 is set lower than the zener voltage $V_{Z11}$ of the zener diode Z11. Therefore, when the operation switch S11 is in the ON state and the operation switch S12 is in the OFF state, a voltage lower than the threshold voltage of the transistor Tr13 is applied between the base and emitter electrodes thereof because the base voltage of the transistor Tr12 becomes lower than the base voltage of the transistor Tr13, and then the transistor Tr13 is kept in the OFF state. When the transistor Tr13 is in the OFF state, the second operating voltage generating circuit 100 is not involved in the operation of the switching power supply.

When the transistor Tr13 is brought into the ON state, the voltage applied to the Vcc line can be represented as:

$$V_{Z12} - 2V_{th}$$

(where Vth represents both the voltage between the base and emitter electrodes of the transistor Tr13 and the forward voltage of the diode D12). The operating voltage supplied to the Vcc line by the second operating voltage generating circuit 100 is referred to as "Vcc3."

Because the zener voltage $V_{Z12}$ of the zener diode Z12 is lower than the zener voltage $V_{Z11}$ of the zener diode Z11 as pointed out earlier, the relationship between Vcc2 and Vcc3 can be represented as:

$$Vcc2 > Vcc3$$

Therefore, the second operating voltage generating circuit 100 is activated only when the transistor Tr12 is in the OFF state owing to the operation switch S11 turning OFF or the operation switch S12 turning ON.

In the switching power supply of this embodiment, the minimum operating voltage of the pre-regulator control circuit 71 is set lower than Vcc2 and equal to or greater than Vcc3, and the minimum operating voltage of the half bridge converter control circuit 72 is set lower than Vcc3. Therefore, the pre-regulator control circuit 71 can drive the main switches Q11 and Q12 when either the auxiliary power supply circuit 80 or the first operating voltage generating circuit 90 is in the active state, while the pre-regulator control circuit 71 cannot drive the main switches Q11 and Q12 when the second operating voltage generating circuit 100 is in the active state and neither the auxiliary power supply circuit 80 nor the first operating voltage generating circuit 90 is in the active state. The half bridge converter control circuit 72 can drive the main switches Q13 and Q14 when any one of the auxiliary power supply circuit 80, the first operating voltage generating circuit 90, and the second operating voltage generating circuit 100 is in the active state.

The rectifier 110 is composed of rectifying switches Q15 and Q16 and resistors R14 and R15. The rectifying switch Q15 is connected between a secondary coil Ls11 of the transformer T2 and the low-side output power terminal 44. The rectifying switch Q16 is connected between a secondary coil Ls12 of the transformer T2 and the low-side output power terminal 44. The gate electrode of the rectifying switch Q15 is connected to the secondary coil Ls12 and the gate electrode of the rectifying switch Q16 is connected to the secondary coil Ls11. That is, the rectifier 110 is of a self-drive type. Further, the resistors R14 and R15 are inserted between the gate and source electrodes of the rectifying switches Q15 and Q16, respectively, so as to prevent the gate electrodes thereof from being in the floating state.

The smoothing circuit 120 is composed of an output reactor Lout connected between the rectified end of the rectifier 110 and the high-side output power terminal 43 and an output capacitor Cout connected between the pair of output power terminals 43 and 44.

A load, which is not an element included in the switching power supply, connected between the pair of output power terminals 43 and 44 can be represented by a resistance component RLoad, capacitance component CLoad, and reactance component LLoad.

Next, the operation of the switching power supply of this embodiment will now be explained.

Figure 2:
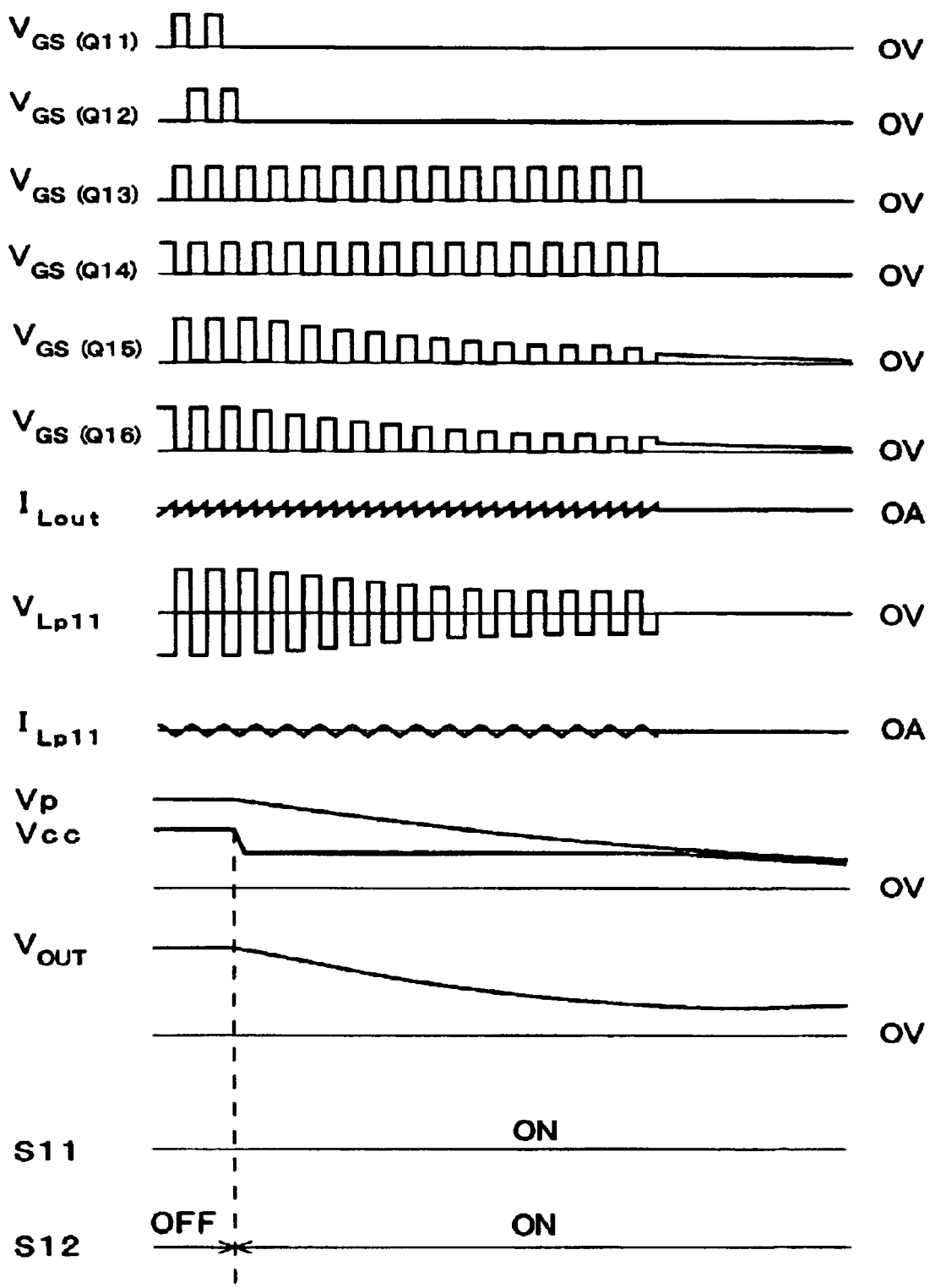
FIG. 2 is a timing chart showing the operation of the switching power supply shown in FIG. 1 where a resistance component RLoad of a load is considerably large.

FIG. 2 is a timing chart showing the operation of the switching power supply of this embodiment.

In order to activate the switching power supply of this embodiment, the operation switch S11 must be changed to the ON state and the operation switch S12 must be changed to the OFF state from outside. When the operation switch S11 is changed to the ON state and the operation switch S12 is changed to the OFF state, the level of the Vcc line becomes Vcc2 because the transistor Tr12 in the first operating voltage generating circuit 90 turns ON.

Because of this, both the pre-regulator control circuit 71 and the half bridge converter control circuit 72 are activated. Specifically, the pre-regulator control circuit 71 brings the main switches Q11 and Q12 into the ON state in turn with a certain duty factor based on the voltage Vout' and the half bridge converter control circuit 72 brings the main switches Q13 and Q14 into the ON state in turn with a fixed duty factor.

Because of this, the polarity of the primary voltage $V_{LP11}$ of the transformer T2 is alternately inversed and, synchronously with the operation of the primary side, the secondary voltages appearing at the secondary coils Ls11 and Ls12 of the transformer T2 are also alternately inversed, so that the rectifying switches Q15 and Q16 are alternately brought into ON state in turn. As a result, the secondary voltage of alternately inversed polarity is rectified and the rectified voltage is smoothed by the smoothing circuit 120 so that a stabilized output voltage Vout is generated.

Figure 3:
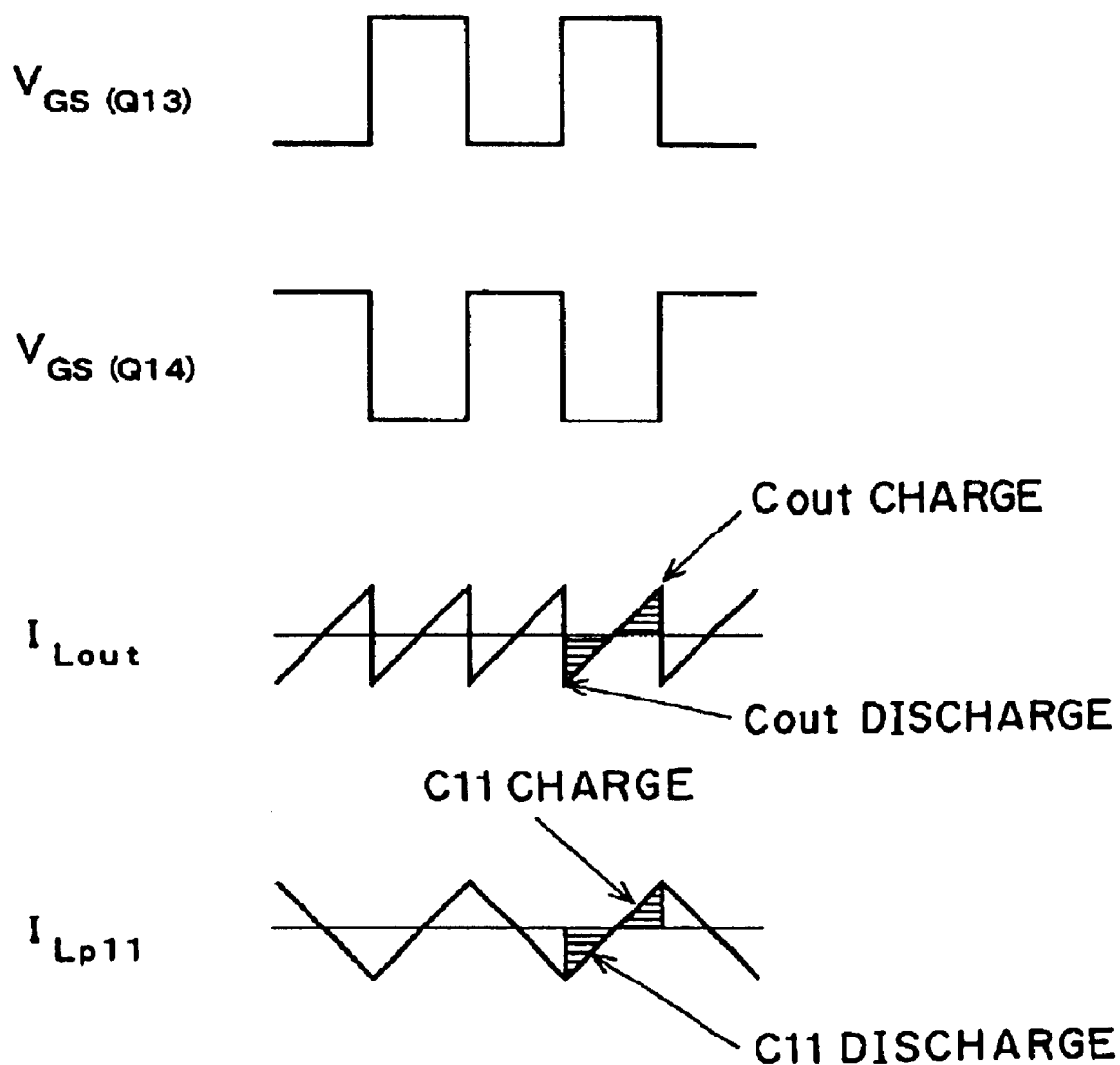
FIG. 3 is an enlarged timing chart showing a principal part of the timing chart shown in FIG. 2.

FIG. 3 is an enlarged timing chart showing a principal part of the timing chart shown in FIG. 2.

As shown in FIG. 3, when the main switches Q13 and Q14 are switched reciprocally under the control of the half bridge converter control circuit 72, the frequency of the current $I_{Lout}$ flowing through the output reactor Lout becomes twice the switching frequency and the frequency of the current $I_{Lp11}$ flowing through the primary coil Lp11 of the transformer T2 becomes the same as the switching frequency. In the case where the direction of the current $I_{Lout}$ flowing through the output reactor Lout is positive, the output capacitor Cout is charged; in the case where the direction of the current $I_{Lout}$ flowing through the output reactor Lout is negative, the output capacitor Cout is discharged.

During the period when the main switch Q13 is in the ON state, the primary side capacitor C11 is discharged while the direction of the current $I_{Lp11}$ flowing through the primary coil Lp11 of the transformer T2 is positive and the primary side capacitor C11 is charged while the direction of the current $I_{Lp11}$ flowing through the primary coil Lp11 of the transformer T2 is negative. Although not shown in FIG. 3, during the period when the main switch Q14 is in the ON state, the primary side capacitor C12 is charged while the direction of the current $I_{Lp11}$ flowing through the primary coil Lp11 of the transformer T2 is positive and the primary side capacitor C12 is discharged while the direction of the current $I_{Lp11}$ flowing through the primary coil Lp11 of the transformer T2 is negative.

When the voltage produced by the switching operation of the half bridge converter circuit 60 appears at the auxiliary coil Lp12 provided at the transformer T2, the auxiliary power supply circuit 80 supplies the operating voltage Vcc1 to the level of the Vcc line. Then, the first operating voltage generating circuit 90 is inactivated.

On the other hand, when the operation switch S12 is changed to the ON state at a desired time, the transistor Tr12 turns OFF because its base voltage is lowered. When the transistor Tr12 turns OFF, the transistor Tr11 also turns OFF because its base voltage is also lowered.

Because of this, the level of the Vcc line is lowered and the transistor Tr13 then turns ON because the voltage between its base and emitter electrodes exceeds its threshold voltage. Then, the level of the Vcc line becomes Vcc3, so that the operation of the pre-regulator control circuit 71 is terminated. That is, both of the main switches Q11 and Q12 assume the OFF state. On the other hand, the main switches Q13 and Q14 continue the switching operation because the minimum operating voltage of the half bridge converter control circuit 72 is set lower than Vcc3.

Therefore, the rectifying switches Q15 and Q16 also continue the switching operation with a normal switching frequency and neither the rectifying switch Q15 nor Q16 is kept in the ON state as in the conventional switching power supply.

As described in the foregoing, according to the switching power supply of this embodiment, because the main switches Q13 and Q14 continue the switching operation after an instruction for stopping the operation of the switching power supply is issued by means of turning ON of the operation switch S12, energy stored in the output capacitor Cout and the capacitance component CLoad of the load is gradually consumed by the resistance component RLoad of the load, the main switches Q13 and Q14, the rectifying switches Q15 and Q16, and so forth, so that the output voltage Vout is lowered. During this period, because the main switches Q13 and Q14 continue the switching operation with a normal switching frequency, the output voltage Vout does not decrease while fluctuating as in the conventional switching power supply but the output voltage Vout decreases substantially linearly.

Further, in the switching power supply of this embodiment, the main switches Q13 and Q14 continue the switching operation even after the operation switch S12 is changed to the ON state. Therefore, unlike in the conventional switching power supply, no flyback voltage arises and thus the internal voltage Vp in the switching circuit is not increased. The internal voltage Vp in the switching circuit decreases linearly as shown in FIG. 2. On the other hand, when the level of the Vcc line lowers the minimum operating voltage of the half bridge converter control circuit 72, all of the switching operations are terminated. At this time, because the most of the energy stored in the output capacitor Cout and the capacitance component CLoad of the load has already been consumed, the output voltage Vout does not fluctuate over very long period as in the conventional switching power supply.

Furthermore, because the switching operation of the main switches Q13 and Q14 after the operation switch S12 is changed to the ON state is the same as the switching operation during normal operation, the current flowing through the output reactor Lout is also the same as that of normal operation and no abnormal current flows.

Moreover, in the switching power supply of this embodiment, because the main switches Q13 and Q14 continue the switching operation after the instruction for stopping the operation of the switching power supply is issued by means of turning ON of the operation switch S12, a LCR serial circuit consisting of the rectifying switch Q15 (body diode), the secondary coil Ls11 of the transformer T2, the output reactor Lout, and the output capacitor Cout and another LCR serial circuit consisting of the rectifying switch Q16 (body diode), the secondary coil Ls12 of the transformer T2, the output reactor Lout, and the output capacitor Cout oscillate when the formula (3) is satisfied:

$$RLoad^2 < 4 \cdot \frac{LLoad}{Cout + \left(\frac{N1}{N2}\right)^2 \cdot (C11 + C12)} \quad (3)$$

where N1 represents the number of turns of the primary coil Lp11 of the transformer T2 and N2 represents the number of turns of the secondary coils Ls11 and Ls12 of the transformer T2.

As can be seen from the formula (3), according to this embodiment, the LCR serial circuits resist oscillation because the capacitances of the primary side capacitors C11 and C12 are added to the formula (1). Therefore, undershoot of the output voltage Vout can be prevented by utilizing the capacitances of the primary side capacitors C11 and C12 without using any additional capacitor Cex.

Figure 4:
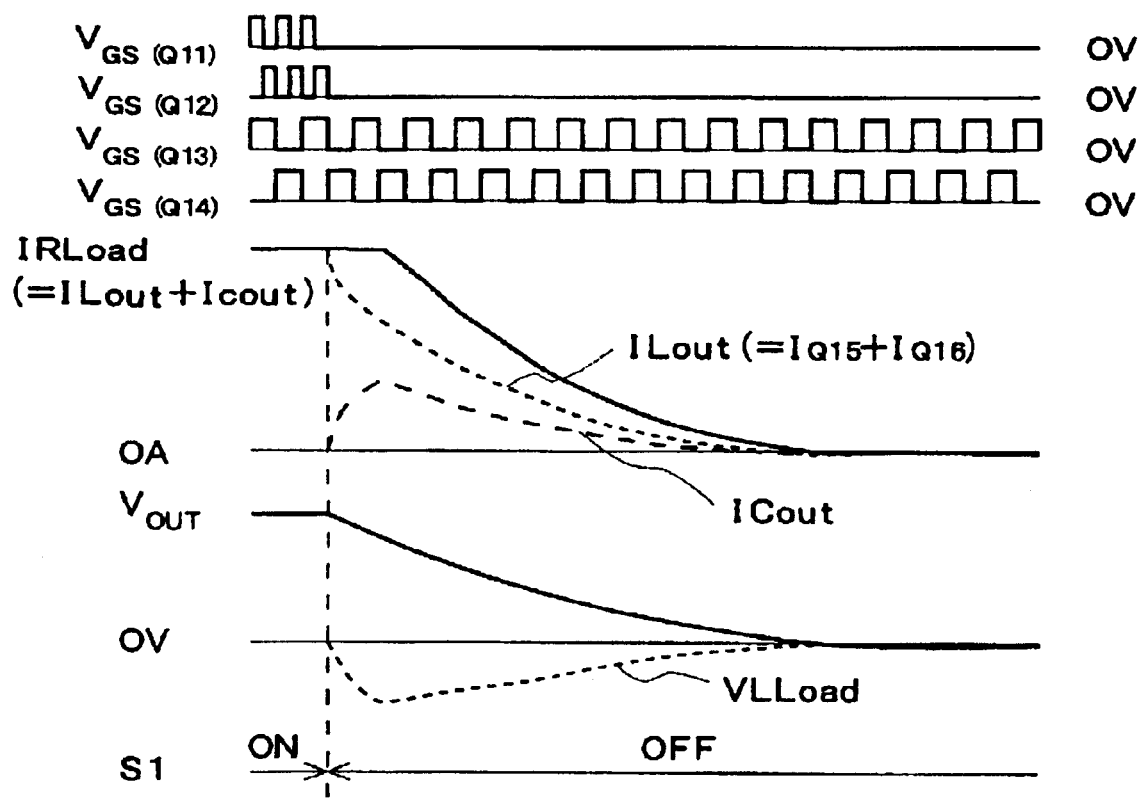
FIG. 4 is a timing chart showing the operation of the switching power supply shown in FIG. 1 where a resistance component RLoad of a load is considerably small.

FIG. 4 is a timing chart showing the operation of the switching power supply shown in FIG. 1 where the resistance component RLoad of the load is considerably small.

As shown in FIG. 4, in the case where the formula (3) is not satisfied for the capacitances of the primary side capacitors C11 and C12, even if a voltage $V_{LLoad}$ rises at the reactance component LLoad of the load, the output voltage Vout does not become negative because the LCR serial circuits do not satisfy the oscillating condition. That is, undershoot of the output voltage Vout can be prevented.

As explained above, according to the switching power supply of this embodiment, because by the operation switch S12 turning ON the operation of the switching power supply can be terminated without occurrence of the various problems which arise in the conventional switching power supply, the operation of the switching power supply of this embodiment can be started and terminated with the operation switch S11 in the ON state. Therefore, the switching power supply of this embodiment is especially suitable in the case that the operation switch S11 is provided outside the switching power supply.

Further, in the switching power supply of this embodiment, because the first operating voltage generating circuit 90 is inactivated during normal operation while the operating voltage is supplied to the Vcc line by the auxiliary power supply circuit 80, no electrical loss occurs in the first operating voltage generating circuit 90 during normal operation.

Furthermore, because the switching power supply of this embodiment performs a step-down of the input voltage Vin by two series converter circuits, the pre-regulator circuit 50 and the half bridge converter circuit 60, the electrical loss occurring in each converter circuit can be decreased, so that allover conversion efficiency is enhanced.

Although FIGS. 2 and 4 show the case where the operation of the switching power supply of this embodiment is terminated by turning the operation switch S12 on, it can be also terminated by turning the operation switch S11 off. Also in this case, the operation of the switching power supply can be terminated without occurrence of the various problems which arise in the conventional switching power supply, similarly to the case of turning the operation switch S12 on.

Figure 5:
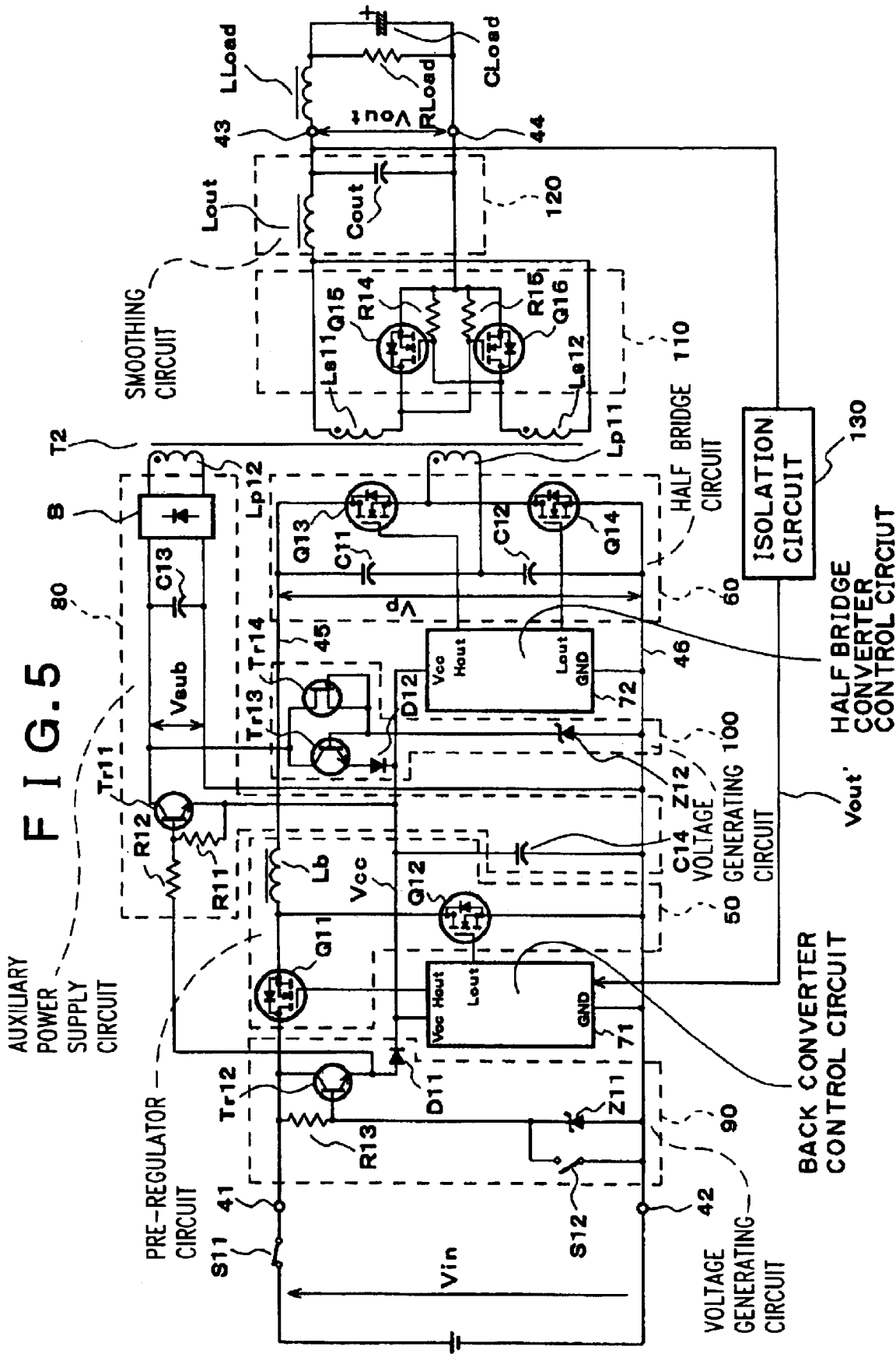
FIG. 5 is a circuit diagram showing a modified example of the switching power supply shown in FIG. 1.

In the switching power supply of this embodiment, although both the collector electrode of the transistor Tr13 and the drain electrode of the transistor Tr14, which are included in the second operating voltage generating circuit 100, are connected to the internal line 45, they can instead be connected to the high-side output node of the diode bridge circuit B included in the auxiliary power supply circuit 80, as shown in FIG. 5. The switching power supply shown in FIG. 5 can perform almost the same operation as the switching power supply shown in FIG. 1.

Next, another preferred embodiment of the present invention will be explained.

Figure 6:
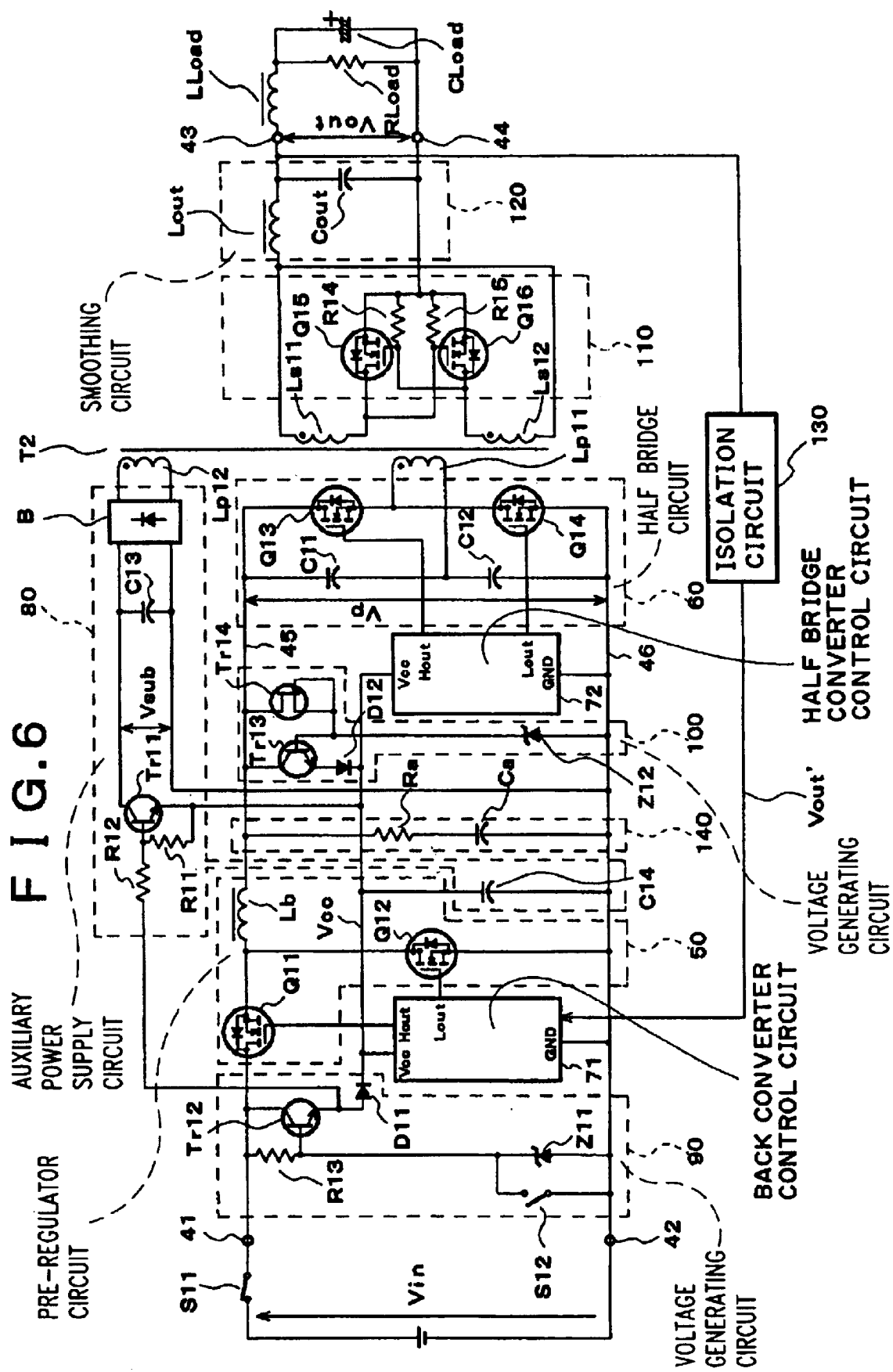
FIG. 6 is a circuit diagram showing a switching power supply that is another preferred embodiment of the present invention.
Figure 7:
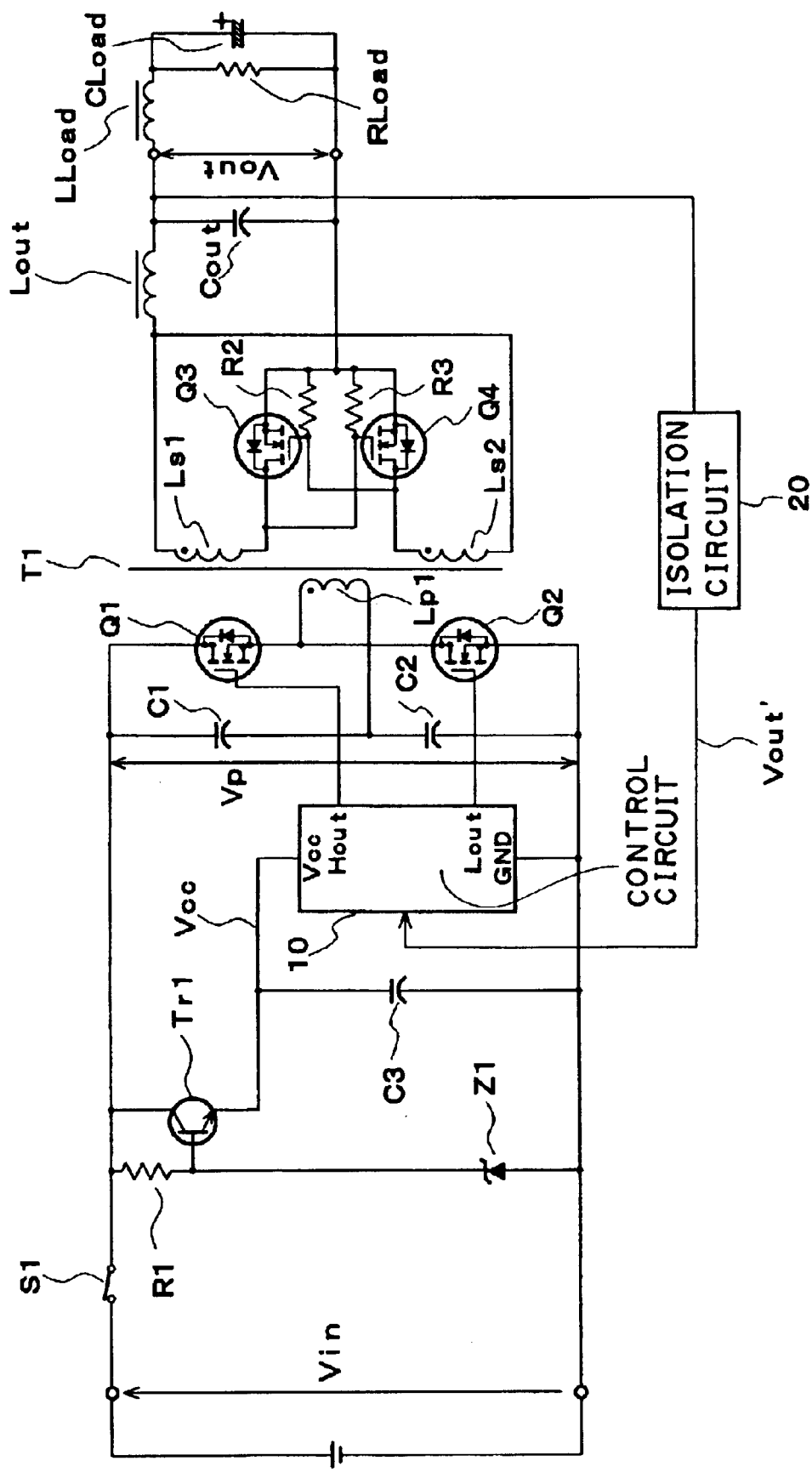
FIG. 7 is a circuit diagram showing a conventional switching power supply.
Figure 8:
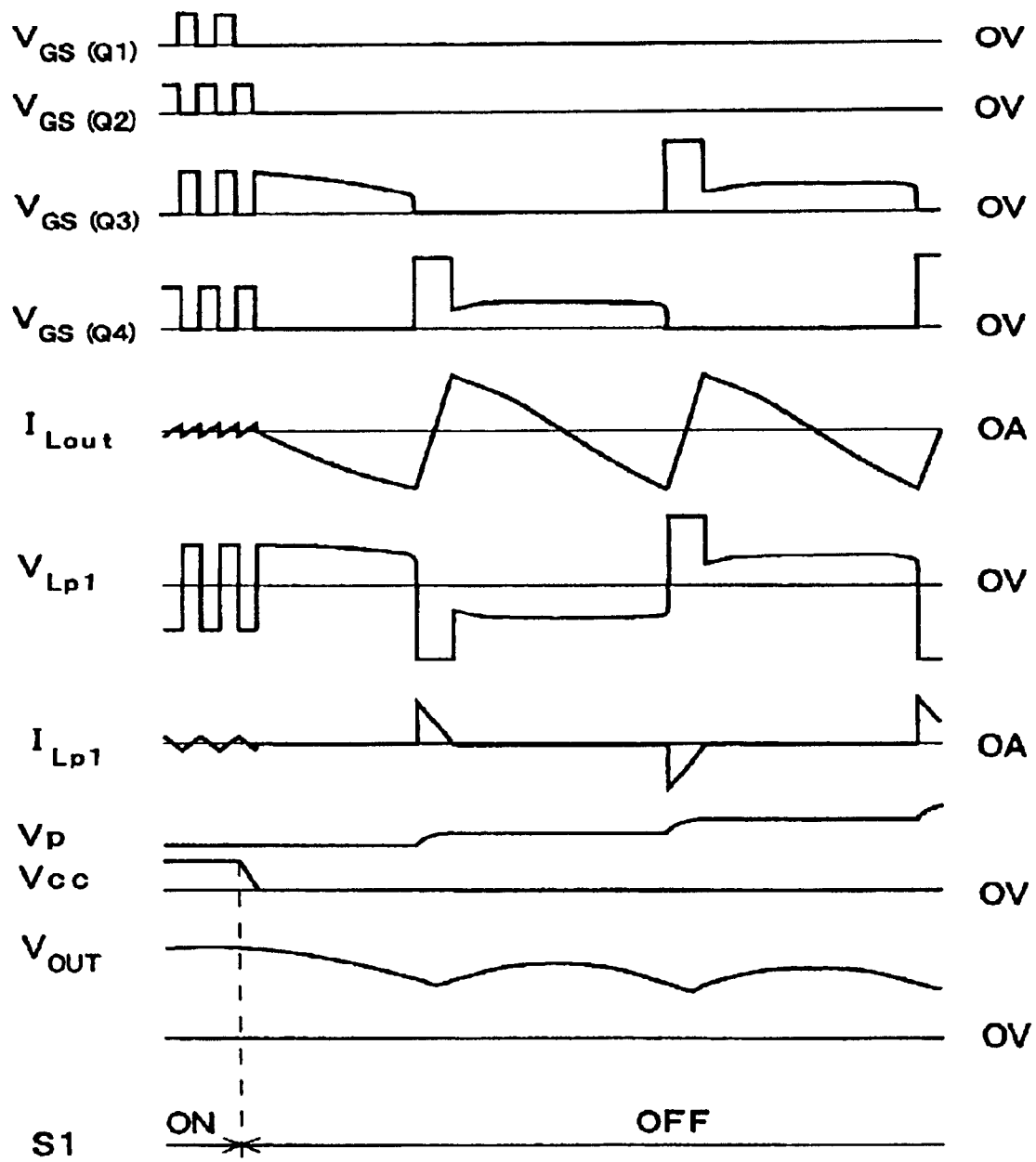
FIG. 8 is a timing chart showing the operation of the conventional switching power supply shown in FIG. 7.
Figure 9:
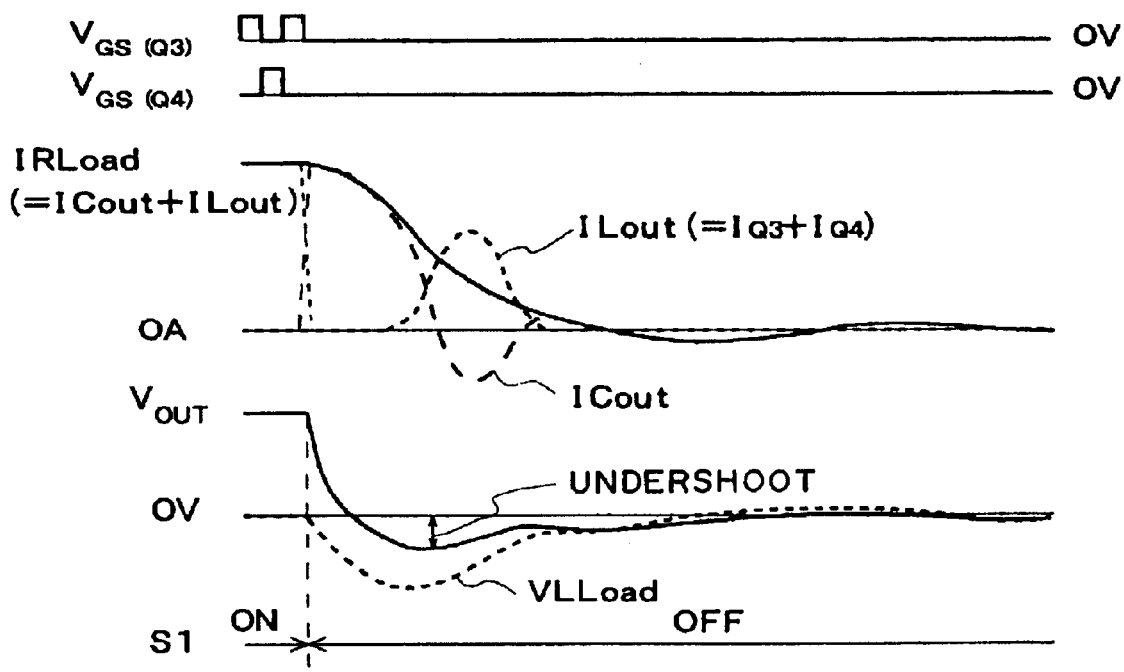
FIG. 9 is a timing chart showing undershoot of the output voltage Vout when an instruction for stopping the operation of the switching power supply is issued.

FIG. 6 is a circuit diagram showing a switching power supply that is another preferred embodiment of the present invention.

As shown in FIG. 6, the switching power supply of this embodiment has the same structure as the switching power supply shown in FIG. 1 except that an additional circuit 140 is added.

The additional circuit 140, which is composed of an additional capacitor Ca and an additional resistor Ra connected in series between the internal lines 45 and 46, is used to prevent the LCR serial circuits from oscillating. In this embodiment, when the formula (4) is satisfied, the LCR serial circuits oscillate so that undershoot arises.

$$RLoad^2 < 4 \cdot \frac{LLoad}{Cout + \left(\frac{N1}{N2}\right)^2 \cdot (C11 + C12) + \left(2 \cdot \frac{N1}{N2}\right)^2 \cdot Ca} \quad (4)$$

As can be seen from the formula (4), according to this embodiment, the LCR serial circuits still more strongly resist oscillation because the capacitance of the additional capacitor Ca is added to the formula (3). Therefore, the switching power supply of this embodiment is suitable where undershoot of the output voltage Vout cannot be prevented by only utilizing the capacitances of the primary side capacitors C11 and C12, i.e., when the formula (3) is satisfied. It is worth noting that because the additional capacitor Ca and the additional resistor Ra constitute a time constant circuit, the additional circuit 140 does not affect the operation of the switching power supply during normal operation.

The additional circuit 140 can be added to the switching power supply shown in FIG. 5.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, the desired operations can be realized by setting the zener voltage $V_{Z12}$ of the zener diode Z12 lower than the zener voltage $V_{Z11}$ of the zener diode Z11. However, it is allowable for the zener voltage $V_{Z11}$ of the zener diode Z11 and the zener voltage $V_{Z12}$ of the zener diode Z12 to have the same value or for the zener voltage $V_{Z11}$ of the zener diode Z11 to be lower than the zener voltage $V_{Z12}$ of the zener diode Z12, so long as the base voltage of the transistor Tr12 is higher than the base voltage of the transistor Tr13 when the operation switch S11 is in the ON state while the operation switch S12 is in the OFF state.

Further, in the above described embodiments, the desired operations can be realized by setting the minimum operating voltage of the pre-regulator control circuit 71 higher than that of the half bridge converter control circuit 72. However, it is allowable for these minimum operating voltages to have the same value or for the minimum operating voltage of the pre-regulator control circuit 71 to be lower than that of the half bridge converter control circuit 72, so long as the pre-regulator control circuit 71 is inactivated while the half bridge converter control circuit 72 is kept in the active state when the second operating voltage generating circuit 100 is activated, by, for example, adding one or more diodes in series between the Vcc line and the Vcc input terminal of the pre-regulator control circuit 71.

Furthermore, in the above described embodiments, the primary side circuit of the transformer T2 is composed of the pre-regulator circuit 50 and the half bridge converter circuit 60 connected in series; however, the primary side circuit of the transformer T2 is not limited to this structure and other converter circuits can be used in series as the primary side circuit of the transformer T2. For example, a boost converter circuit or the like can be used instead of the pre-regulator circuit 50, and a forward converter circuit, full bridge converter circuit, push-pull converter circuit or the like can be used instead of the half bridge converter circuit 60.

Further, in the above described embodiments, the rectifier 110 is of the self-drive type. However, because the problem that the output voltage Vout undershoots during the operation terminating arises whether the rectifier is a self-drive type or not, a rectifier of an ordinary type using diodes or a rectifier of a synchronous type controlled by a driver circuit can be used instead of the rectifier 110 of the self-drive type.

Furthermore, in the above described embodiments, although the pre-regulator control circuit 71 and the half bridge converter control circuit 72 belong to the primary side of the transformer T2; they can belong to the secondary side of the transformer T2.

As described above, according to the switching power supply of the present invention, the operation of the switching power supply can be terminated in such a manner that the output voltage Vout is substantially linearly lowered without fluctuating or undershooting. Malfunction of the load can therefore be effectively avoided. Moreover, according to the switching power supply of the present invention, the internal voltage Vp in the switching circuit on the primary side is prevented from gradually increasing when the instruction for stopping the operation of the switching power supply is issued. The electric components used on the primary side are therefore effectively protected from damage. Further, because it is not necessary to use components having high withstand voltage, the cost of the switching power supply can be lowered. Furthermore, because a large current does not flow thorough the output reactor Lout when the instruction is issued, the reliability of the switching power supply can be enhanced.

Therefore, the switching power supply of the present invention is suitable as switching power supply for supplying electric power to a load having a large capacitance component CLoad. Further, the switching power supply of the present invention is particularly suitable as a switching power supply for supplying electric power to a load that tends to frequently assume a light-load condition. Furthermore, the switching power supply of the present invention is also suitable as a switching power supply for supplying electric power to a load that requires a low voltage and a large current, such as a server computer. That is, according to the present invention, the switching power supply can lower its output voltage Vout substantially linearly even if the instruction for stopping the operation of the switching power supply is issued at heavy-load condition or light-load condition.

What is claimed is:

1. A switching power supply, comprising:
   a transformer having a primary coil and a secondary coil;
   a switching circuit connected between an input terminal and the primary coil of the transformer;
   a rectifier connected to the secondary coil of the transformer;
   a control circuit controlling the switching circuit; and first and second operating voltage generating circuits each generating an operating voltage of the control circuit;

a first operating voltage generated by the first operating voltage generating circuit and a second operating voltage generated by the second operating voltage generating circuit having different values from each other the first operating voltage generating circuit including a first zener diode which determines a value of the first operating voltage and the second operating voltage generating circuit includes a second zener diode which determines a value of the second operating voltage, a zener voltage of the first zener diode and a zener voltage of the second zener diode having different values from each other.

2. The switching power supply as claimed in claim 1, wherein the first operating voltage generating circuit further includes an operation switch connected in parallel with the first zener diode.

3. The switching power supply as claimed in claim 1, wherein the switching circuit includes first and second converters connected in series between the input terminal and the primary coil of the transformer.

4. The switching power supply as claimed in claim 1, wherein the switching circuit includes first and second converters connected in series between the input terminal and the primary coil of the transformer.

5. The switching power supply as claimed in claim 4, wherein the control circuit includes a first converter control circuit controlling the first converter and a second converter control circuit controlling the second converter, the first operating voltage generating circuit supplying the first operating voltage to a power supply line commonly provided for the first and second converter control circuits, and the second operating voltage generating circuit supplying the second operating voltage to the power supply line.

6. The switching power supply as claimed in claim 5, wherein the first and second converter control circuits are enabled when the first operating voltage generating circuit is in an active state, and the first converter control circuit is disabled when the second operating voltage generating circuit is in an active state.

7. The switching power supply as claimed in claim 5, wherein a minimum operating voltage of the first converter control circuit and a minimum operating voltage of the second converter control circuit are different value from each other.

8. The switching power supply as claimed in claim 5, further comprising an auxiliary power supply circuit for supplying a third operating voltage to the power supply line using a voltage appearing at an auxiliary coil provided on the primary side of the transformer.

9. The switching power supply as claimed in claim 8, wherein the third operating voltage is higher than the first and second operating voltages.

10. The switching power supply as claimed in claim 3, wherein the first converter is selected from a group of a buck converter and a boost converter, and the second converter is selected from a group of a half bridge converter, a forward converter, a full bridge converter, and a push-pull converter.

11. The switching power supply as claimed in claim 1, wherein the rectifier is of a self-drive type.

12. A switching power supply, comprising:

a transformer having a primary coil and a secondary coil;

a switching circuit connected between an input terminal and the primary coil of the transformer;

a rectifier connected to the secondary coil of the transformer;

a smoothing circuit located at a subsequent stage of the rectifier and including an output capacitor;

a control circuit controlling the switching circuit; and means, responsive to an instruction for stopping a switching operation, for supplying an operating voltage to the control circuit using at least energy stored in the output capacitor.

13. The switching power supply as claimed in claim 12, wherein the operating voltage supplied from the means is lower than an operating voltage supplied to the control circuit during a normal operation.

14. The switching power supply as claimed in claim 12, wherein the rectifier is of a self-drive type.

15. The switching power supply as claimed in claim 13, wherein the rectifier is of a self-drive type.

16. A switching power supply, comprising:

a transformer having a primary coil and a secondary coil;

first and second converters connected in series between an input terminal and the primary coil of the transformer;

a rectifier connected to the secondary coil of the transformer;

a control circuit controlling the first and second converters; and means, responsive to an instruction for stopping a switching operation, for stopping operations of the first and second converters in this order.

17. The switching power supply as claimed in claim 16, wherein the means causes the operation of the second converter to continue using energy supplied from a secondary side of the transformer during a period from a time when the instruction is issued to a time of the operation for stopping the second converter.

18. The switching power supply as claimed in claim 16, wherein the rectifier is of a self-drive type.

19. The switching power supply as claimed in claim 17, wherein the rectifier is of a self-drive type.

* * * * *